United States Patent
Kurishige et al.

(10) Patent No.: US 6,496,762 B2
(45) Date of Patent: Dec. 17, 2002

(54) ELECTRIC POWER STEERING CONTROLLER AND METHOD OF CONTROLLING SAME

(75) Inventors: Masahiko Kurishige, Tokyo (JP); Noriyuki Inoue, Tokyo (JP); Ryoji Nishiyama, Tokyo (JP); Shunichi Wada, Tokyo (JP); Hisasi Inoyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 69 days.

(21) Appl. No.: 09/781,543

(22) Filed: Feb. 13, 2001

(65) Prior Publication Data

US 2002/0019690 A1 Feb. 14, 2002

(30) Foreign Application Priority Data

Feb. 25, 2000 (JP) .......................... 2000-049665

(51) Int. Cl.[7] .................................. B62D 5/06
(52) U.S. Cl. ..................... 701/41; 701/43; 180/446
(58) Field of Search .......................... 701/41, 43, 42; 180/446, 404, 443

(56) References Cited

U.S. PATENT DOCUMENTS

| | | | |
|---|---|---|---|
| 5,740,040 A | 4/1998 | Kifuku et al. | 701/41 |
| 5,828,972 A | 10/1998 | Asanuma et al. | 701/41 |
| 5,904,223 A * | 5/1999 | Shimizu et al. | 180/443 |
| 5,996,724 A * | 12/1999 | Shimizu et al. | 180/446 |
| 6,018,691 A | 1/2000 | Yamamoto et al. | 701/41 |

FOREIGN PATENT DOCUMENTS

| | | |
|---|---|---|
| EP | 0 860 347 | 8/1998 |
| JP | 6-87458 | 3/1994 |
| JP | 7-186994 | 7/1995 |

OTHER PUBLICATIONS

Mitsubishi Denki Giho, vol. 70, No. 9, 1996, pp. 43–48.

* cited by examiner

Primary Examiner—William A. Cuchlinski, Jr.
Assistant Examiner—Marthe Marc-Coleman
(74) Attorney, Agent, or Firm—Leydig, Voit & Mayer, Ltd.

(57) ABSTRACT

A method of controlling an automotive electric power steering system includes estimating a first road reaction torque from driver's steering torque detected by a steering torque detector. A second road reaction torque is estimated from the steering angle detected by a steering angle sensor. A returning torque compensator calculates a steering wheel-assisting torque from the second road reaction torque. An assisting torque is generated by an electric motor according to the result of the calculation, and is controlled in a direction to return the steering wheel to its center position. The returning torque compensator determines whether the steering angle sensor is faulty when the difference between the first and second road reaction torques is greater than a given value.

13 Claims, 14 Drawing Sheets

PRIOR ART

ELECTRIC POWER STEERING CONTROLLER AND METHOD OF CONTROLLING SAME

BACKGROUND OF THE INVENTION

1. Field of the Invention

The present invention relates to an automotive electric power steering controller that uses an electric motor to generate torque for assisting driver's steering force to thereby supplement the steering force supplied to the steering system. The invention also relates to a method of controlling this electric power steering controller.

2. Description of the Related Art

FIG. 14 is a block diagram showing the structure of the prior art electric power steering controller described, for example, in Japanese Patent Laid-Open No. 186994/1995. This controller has a steering torque detector 1 for detecting steering torque when the driver steers. A steering torque controller 2 calculates an assisting torque based on the output from the steering torque detector 1 and produces an output signal indicating the calculated assisting torque. A motor speed detector 3 detects the speed of an electric motor. A damping compensator 4 calculates and produces a damping compensation signal based on the motor speed detected by the motor speed detector 3. A motor acceleration detector 5 detects the acceleration of the motor using the output from the motor speed detector 3. An inertia compensator 6 calculates and produces an inertia compensation signal based on the motor acceleration detected by the motor acceleration detector 5. A judging unit 7 makes a decision as to whether the output from the steering torque detector 1 and the output from the motor speed detector 3 are identical in sense and supplies the result of the decision to all of the steering torque controller 2, the damping compensator 4, and the inertia compensator 6. A first adder 8 produces the sum of the assisting torque signal, the damping compensation signal, and the inertia compensation signal. This sum is referred to as the target torque. A motor current determiner 9 calculates and produces a target current signal from the target torque. The aforementioned motor is indicated by numeral 10, produces a motor current value corresponding to an applied voltage, and generates an assisting torque that is roughly in proportion to the motor current value, thus driving the steering mechanism. A motor current detector 11 detects the current value of the motor 10. A second adder 12 finds the difference between the target current signal produced by the motor current determiner 9 and the motor current value detected by the motor current detector 11. A motor driver 13 determines a voltage applied to the motor 10 according to the error between the target current signal calculated by the motor current determiner 9 and the motor current value detected by the motor current detector 11 and applies the determined voltage to the motor 10. A vehicle speed detector 14 detects the speed of the vehicle and sends a signal indicating the detected vehicle speed to all of the steering torque controller 2, damping compensator 4, and inertia compensator 6.

The operation of the prior art electric power steering system constructed in this way is now described. When the driver of the automobile steers the steering wheel, the produced steering torque is measured by the steering torque detector 1 and sent to the steering torque controller 2. This torque controller 2 calculates the assisting torque that is roughly in proportion to the output signal from the steering torque detector 1 and drives the motor 10 according to the assisting torque signal. In this way, the motor supplements the driver's steering torque. Consequently, the steering torque that the driver must produce is alleviated.

At this time, the judging unit 7 makes a decision as to whether the output from the steering torque detector 1 and the output from the motor speed detector 3 are identical in sense. If they are identical, neither the damping compensator 4 nor the inertia compensator 6 is operated; only the steering torque controller 2 is operated. The steering torque controller 2 determines the assisting torque signal according to both output from the steering torque detector 1 and vehicle speed signal from the vehicle speed detector 14. The target torque is determined from this determined assisting torque signal. The motor current determiner 9 determines the motor driving current.

If they are not identical, the steering torque controller 2 is not operated; the damping compensator 4 and the inertia compensator 6 are operated. The target torque is determined from the output from the damping compensator 4 and from the output from the inertia compensator 6. The motor current determination unit 9 determines the motor driving current. If the vehicle speed is low, the target torque is made identical in direction with the rotation of the motor. If the vehicle speed is high, the target torque is made opposite in direction to the rotation of the motor. Accordingly, when the driver is steering the steering wheel, the electric power steering system supplements the driver's steering torque to alleviate the torque necessary for the steering. When the driver is returning the steering wheel, if the vehicle speed is low, the electric power steering system assists the steering wheel to return to its center position. If the vehicle speed is high, the motor 10 is so controlled that the steering wheel is prevented from returning to its center position at an excessively high speed.

Generally, the driver steers when the vehicle turns round road curves or across road junctions and then the vehicle returns to straight-line driving. At this time, he or she returns the steering wheel by making use of spontaneous returning force of the steering wheel owing to reaction torque applied from the road surface through the tires. However, when the vehicle speed is low or the steering wheel is rotated through only a small angle during high-speed driving, the reaction torque applied from the road surface through the tires is weak and so the reaction torque is less than the frictional torque within the steering mechanism. Therefore, the steering wheel often does not return to its center position when the vehicle returns to straight-line driving. In this case, accordingly, the driver must apply torque to the steering wheel in returning the steering wheel. Consequently, the steering feeling deteriorates.

To cope with this problem, the prior art technique makes a decision as to whether the output from the steering torque detector 1 and the output from the motor speed detector 3 are identical in sense at low vehicle speeds. If they are not identical, the motor driving current is so set that the motor 10 is rotated in the forward direction. In this way, the returnability of the steering wheel at low vehicle speeds is improved.

In the prior art technique, when the driver steers while the reaction torque applied from the road surface through the tires is small as encountered when the vehicle turns a junction at a low speed or when turns a curve of a mildly winding road at a high speed, the steering wheel is kept stationary unless the driver applies torque in a direction to return the steering wheel. Hence, the motor 10 does not rotate. At this time, the judging unit 7 cannot judge whether the output from the steering torque detector 1 and the output from the motor speed detector 3 are identical or not. Consequently, the motor driving current cannot be so set that the motor is rotated in the forward direction. Hence, the returnability of the steering wheel cannot be improved.

Furthermore, in the prior art technique, the motor driving current is only allowed to be so set that the motor is rotated in the reverse direction. In consequence, the returnability of the steering wheel cannot be improved.

SUMMARY OF THE INVENTION

The present invention has been made to solve the foregoing problems.

It is an object of the present invention to provide an electric power steering controller which is for use in a vehicle and which permits the driver to return the steering wheel to its center position without applying torque in the direction to return the steering wheel when the driver steers while reaction torque applied from the road surface through the tires is small as encountered when the vehicle turns a junction at a low speed or when the vehicle turns a curve of a mildly winding road at a high speed. The steering controller controls the returning steering wheel using a steering angle corresponding to driver's will and can improve the returnability of the steering wheel under every driving condition.

It is another object of the invention to provide an electric power steering controller capable of coping with faults of sensors if such faults occur.

It is a further object of the invention to provide a method of controlling such an electric power steering controller.

According to this invention an electric power steering controller mounted in an automobile and using torque generated by an electric motor to supplement driver's steering torque, said electric power steering controller comprising:

a steering torque detection means for detecting the steering torque applied by the driver;

a steering angle detection means for detecting a steering angle;

a first road reaction torque estimation means for estimating a first road reaction torque that tires receive from the road surface using the steering torque detected by the steering torque detection means;

a second road reaction torque estimation means for estimating a second road reaction torque using the steering angle detected by the steering angle detection means; and a returning torque compensation means for controlling the assisting torque of said electric motor in a direction to return the steering wheel to its original position according to the second road reaction torque estimated by the second road reaction torque estimation means, said returning torque compensation means judging that the steering angle detection means is at fault when a difference between the first road reaction toque and the second road reaction torque is greater than a given value.

According to this electric power steering controller, the returnability of the wheel can be improved under any operating conditions.

Furthermore, the electric power steering controller wherein said returning torque compensation means judges that there is a fault when a difference between two estimated road reaction torques is kept greater than a given value for a given time.

According to this electric power steering controller, the the power steerinng controller assures detection of a fault if such a fault is present.

Furthermore, the electric power steering controller wherein there is further provided a steering speed detection means for detecting a steering speed, and wherein said returning torque compensation means judges that there is a fault when the steering speed detected by said steering speed detection means is less than a given value and, at the same time, a difference between two estimated road reaction torques is greater than a given value.

According to this electric power steering controller makes the decision operation reliable.

Furthermore, the electric power steering controller wherein said returning torque compensation means judges that there is a fault when the first road reaction torque is greater than other estimated road reaction torque by more than a given value.

According to this electric power steering controller assures that such a fault is detected.

Furthermore, the electric power steering controller wherein said returning torque compensation means judges that the motor has locked when the first road reaction torque is kept greater than other estimated road reaction torque by more than a given value for a given time.

According to this electric power steering controller makes the reliable the operation to judge whether the motor has locked.

Furthermore, the electric power steering controller wherein said returning torque compensation means has a function of judging road conditions and wherein, if the returning torque compensation means judges that a road surface condition is a non-high friction, any decision as to whether the detection means are at fault is not made.

According to this electric power steering controller decisins as to whether the detection means are at fault are made depending on the road surface condition.

In addition, an electric power steering controller mounted in an automobile and using torque generated by an electric motor to supplement driver's steering torque, said electric power steering controller comprising:

a steering torque detection means for detecting the steering torque applied by a driver;

a lateral acceleration detection means for detecting lateral acceleration of the automobile;

a first road reaction torque estimation means for estimating a first road reaction torque that tires receive from the road surface using the steering torque detected by the steering torque detection means;

a third road reaction torque estimation means for estimating a third road reaction torque from the lateral acceleration of the automobile detected by said lateral acceleration detection means; and a returning torque compensation means for controlling the assisting torque produced by said electric motor in a direction to return the steering wheel to its original position according to the third road reaction torque estimated by said third road reaction torque estimation means, said returning torque compensation means judging that the lateral acceleration detection means is at fault when a difference between the first road reaction torque and the third road reaction torque is greater than a given value.

According to this electric power steering controller, the returnablility of the steering wheel can be improved under every operating condition, and the power controller can cope with fault in lateral acceleration detection mean if such faults are present.

In addition, an electric power steering controller mounted in an automobile and using torque generated by an electric motor to supplement driver's steering torque, said electric power steering controller comprising:

a steering torque detection means for detecting the steering torque applied by the driver;

a yaw rate detection means for detecting yaw rate of the automobile;

a first road reaction torque estimation means for estimating a first road reaction torque that tires receive from the road surface using the steering torque detected by said steering torque detection means;

a fourth road reaction torque estimation means for estimating a fourth road reaction torque from the yaw rate of the automobile detected by said yaw rate detection means; and a returning torque compensation means for controlling the assisting torque produced by said electric motor in a direction to return the steering wheel to its original position according to the fourth road reaction torque estimated by said fourth road reaction torque estimation means, said returning torque compensation means judging that the yaw rate detection means is at fault when a difference between said first road reaction torque and said fourth road reaction torque is greater than a given value.

According to this electric power steering controller, the returnability of the steering wheel can be improved under every operating condition, and the power steering controller can cope with a fault in the yaw rate detection means if such a fault is present.

In addition, an electric power steering controller mounted in an automobile and using torque generated by an electric motor to supplement driver's steering torque, said electric power steering controller comprising:

a steering torque detection means for detecting the steering torque applied by the driver;

a first road reaction torque estimation means for estimating a first road reaction torque that tires receive from the road surface using the steering torque detected by said steering torque detection means;

a fifth road reaction torque detection means for detecting a fifth road reaction torque; and a returning torque compensation means for controlling the assisting torque produced by said electric motor in a direction to return the steering wheel to its original position according to the fifth road reaction torque detected by said fifth road reaction torque detection means, said returning torque compensation means judging that any one of the road reaction torque detection means is at fault when a difference between the first road reaction torque and the fifth road reaction torque is greater than a given value.

According to this electric power steering controller renders reliable the decision made as to whether the road reaction torque is abnormal.

Furthermore, the electric power steering controller wherein said returning torque compensation means judges that there is a fault when the first road reaction torque is kept greater than the fifth road reaction force by more than a given value for a given time.

According to this electric power steering controller decisions as to whether the detection means are at fault are made depending on the road condition.

In addition, a method of controlling an electric power steering controller mounted in an automobile by using torque generated by an electric motor to supplement driver's steering torque, said method comprising the steps of:

estimating a first road reaction torque using the steering torque;

estimating a sixth road reaction torque using any one of a steering angle, lateral acceleration of the automobile, and yaw rate of the automobile detected by detection means;

controlling the assisting torque of said motor in a direction to return a steering wheel to its center position according to the estimated sixth road reaction torque; and making a decision based on a difference between said first road reaction torque and said sixth road reaction torque as to whether said detection means are at fault.

According to this method of controlling an electric power steering controller, the returnability of the steering wheel can be improved under every operating condition, and the power steering controller can cope with a fault in the detection means if such a fault is present.

Furthermore, a method of controlling an electric power steering controller, wherein it is judged that there is a fault when a difference between the first and sixth road reaction torques is kept greater than a given value for a given time.

According to this method of controlling the electric power steering controller assures detection of a fault in the detection means if such a fault is present.

Furthermore, a method of controlling the electric power steering controller, wherein road conditions are judged, and wherein, if the road surface condition is a non-high friction, any decision as to whether the detection means are at fault is not made.

According to this method of controlling the power steering controller, a decision as to whether the detection means are at fault can be made depending on the road surface condition.

Other objects and features of the invention will appear in the course of the description thereof, which follows.

DESCRIPTION OF THE PREFERRED EMBODIMENTS

Figure 1:
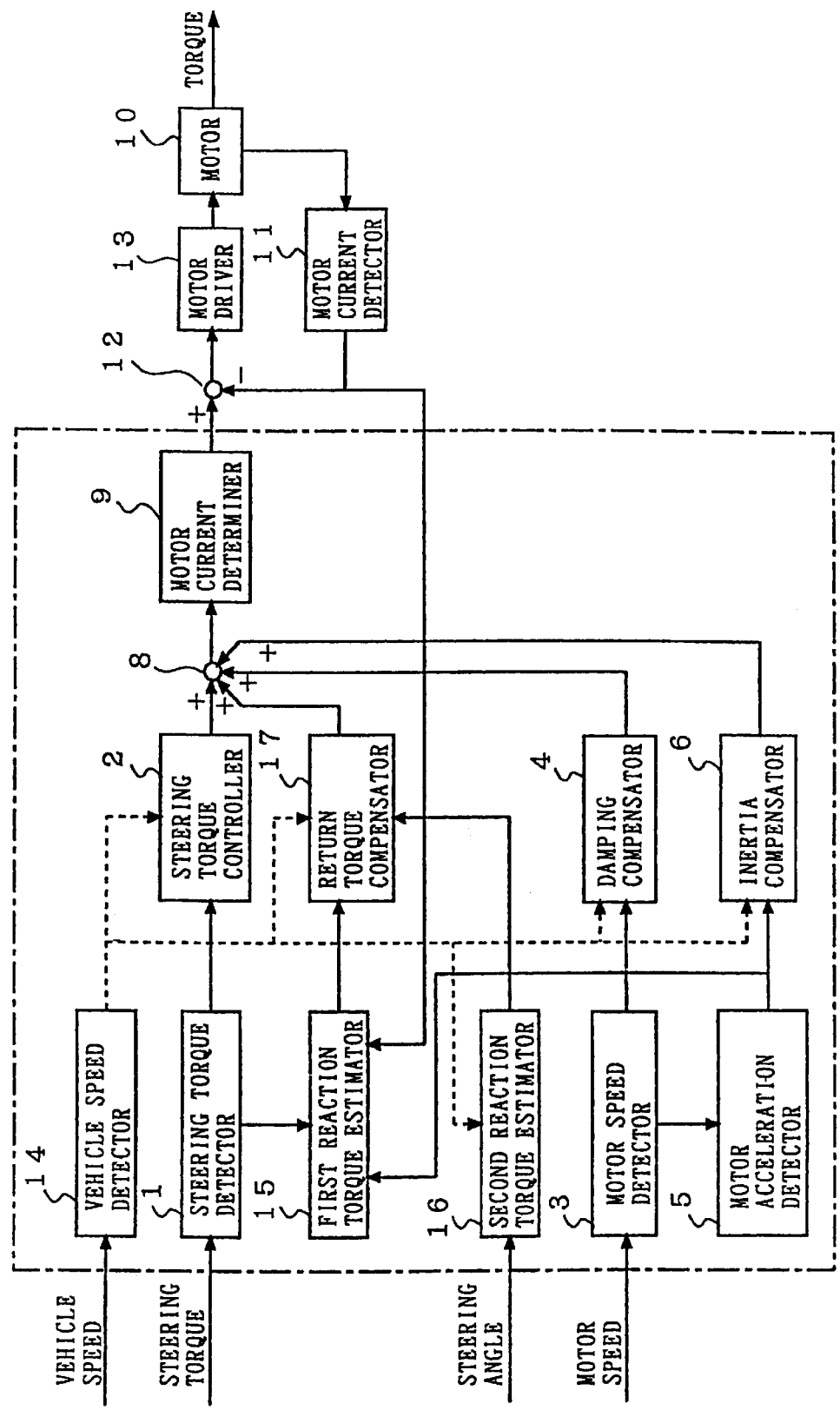
FIG. 1 is a block diagram of an electric power steering controller in accordance with Embodiment 1 of the present invention.

FIG. 1 is a block diagram of an electric power steering controller in accordance with Embodiment 1 of the present invention. This power steering controller has a steering torque detector 1 for detecting a steering torque applied by a driver when he or she steers a vehicle. The steering torque detector 1 forms a steering torque detection means. A steering torque controller 2 calculates an assisting torque based on the output from the steering torque detector 1 and produces a signal indicating this steering torque. A motor speed detector 3 detects the speed of an electric motor (described later). A damping compensator 4 produces a damping compensation signal based on the motor speed detected by the motor speed detector 3. A motor acceleration detector 5 detects the acceleration of the motor using the output from the motor speed detector 3. An inertia compensator 6 produces an inertia compensation signal based on the motor acceleration detected by the motor acceleration detector 5. A first adder 8 produces the sum of the assisting torque signal, a steering wheel return-assisting torque signal (described later), the damping compensation signal, and the inertia compensation signal. This sum is herein also referred to as the target torque. A motor current determination unit 9 determines a target current signal from the target torque. The aforementioned motor is indicated by numeral 10, produces a motor current value corresponding to the applied voltage, and generates an assisting torque roughly in proportion to the motor current value. This assisting torque drives the steering mechanism. A motor current detector 11 detects the current value of the motor 10. A second adder 12 produces the difference between the target current signal from the motor current determiner 9 and the motor current value from the motor current detector 11. A motor driver 13 determines a voltage to be applied to the motor 10 from the error between the target current signal calculated by the motor current determiner 9 and the motor current value detected by the motor current detector 11 and applies the determined voltage to the motor 10. A vehicle speed detector 14 detects the speed of the vehicle and supplies a signal indicating the detected speed to all of the steering torque controller 2, damping compensator 4, inertia compensator 6, and a returning torque compensator (described later).

A first reaction torque estimator 15 forming a first reaction torque estimation means estimates the steering angle of the front wheels (i.e., a first road reaction torque that would return the steering wheel to its original position) using the driver's steering torque detected by the steering torque detector 1, the motor acceleration detected by the motor acceleration detector 5, and the motor current value detected by the motor current detector 11. This estimator 15 performs the estimation using Eq. (1) for estimating a steady-state road reaction torque and Eq. (2) about a low-pass filter. These Eqs. (1) and (2) will be described later. A second reaction torque estimator 16 forming a second road reaction torque estimation means estimates a second road reaction torque (sixth road reaction torque) from the steering angle detected by a steering angle sensor mounted to the steering shaft and from the vehicle speed. The steering angle sensor forms a steering angle detection means. A returning torque compensator 17 forming a returning torque compensation means produces a steering wheel return-assisting torque signal according to the first and second road reaction torques and causes the motor 10 to produce an assisting torque in a direction to return the steering wheel to its center position.

A motor speed sensor such as a tachogenerator can be used as the motor speed detector 3. Furthermore, the motor speed may be detected by differentially detecting the pulse output from a rotary encoder. Alternatively, the motor speed may be detected by taking the product of the current value fed into the motor and the coil resistance value and subtracting this product from the voltage applied to the motor to thereby obtain a counter electromotive force.

Figure 2:
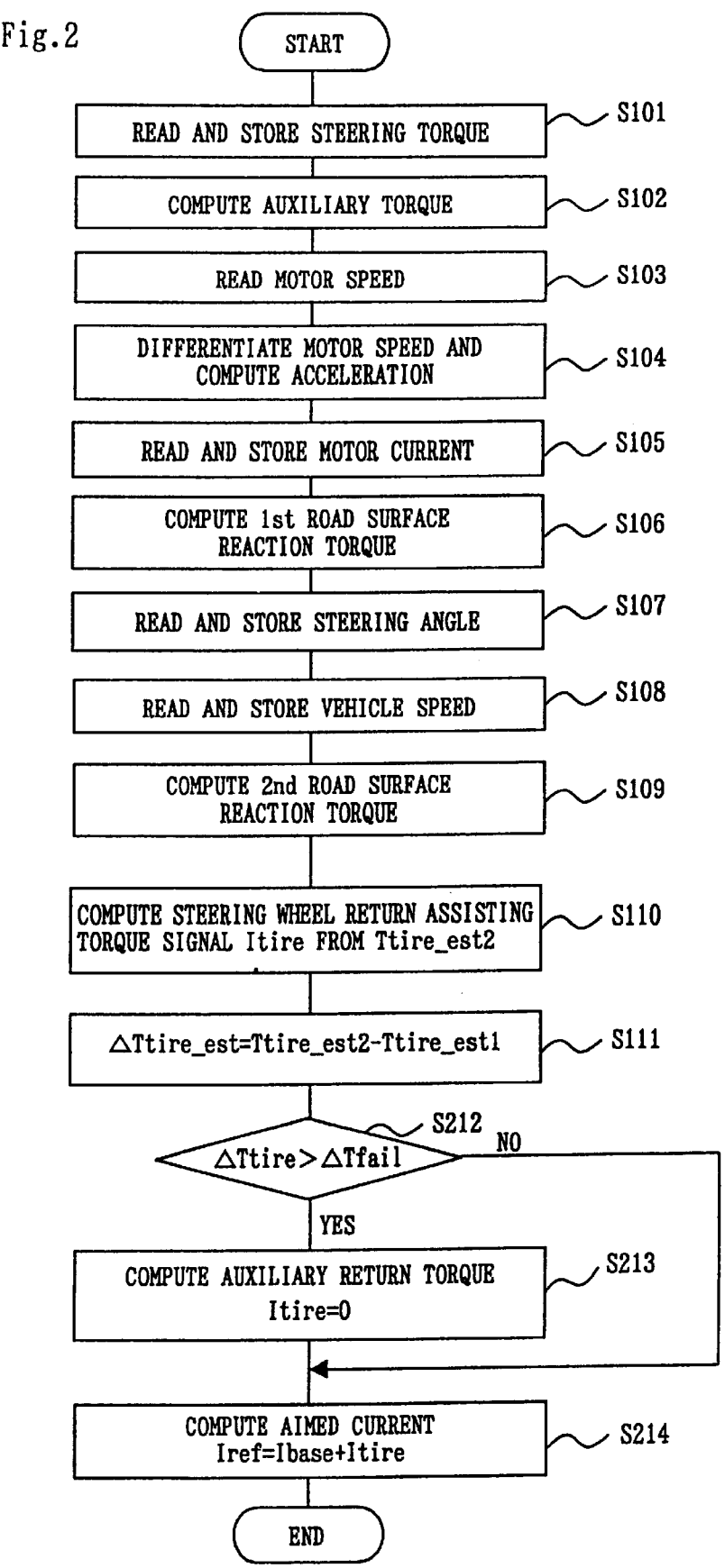
FIG. 2 is a flowchart illustrating the operation of the electric power steering controller shown in FIG. 1.
Figure 3:
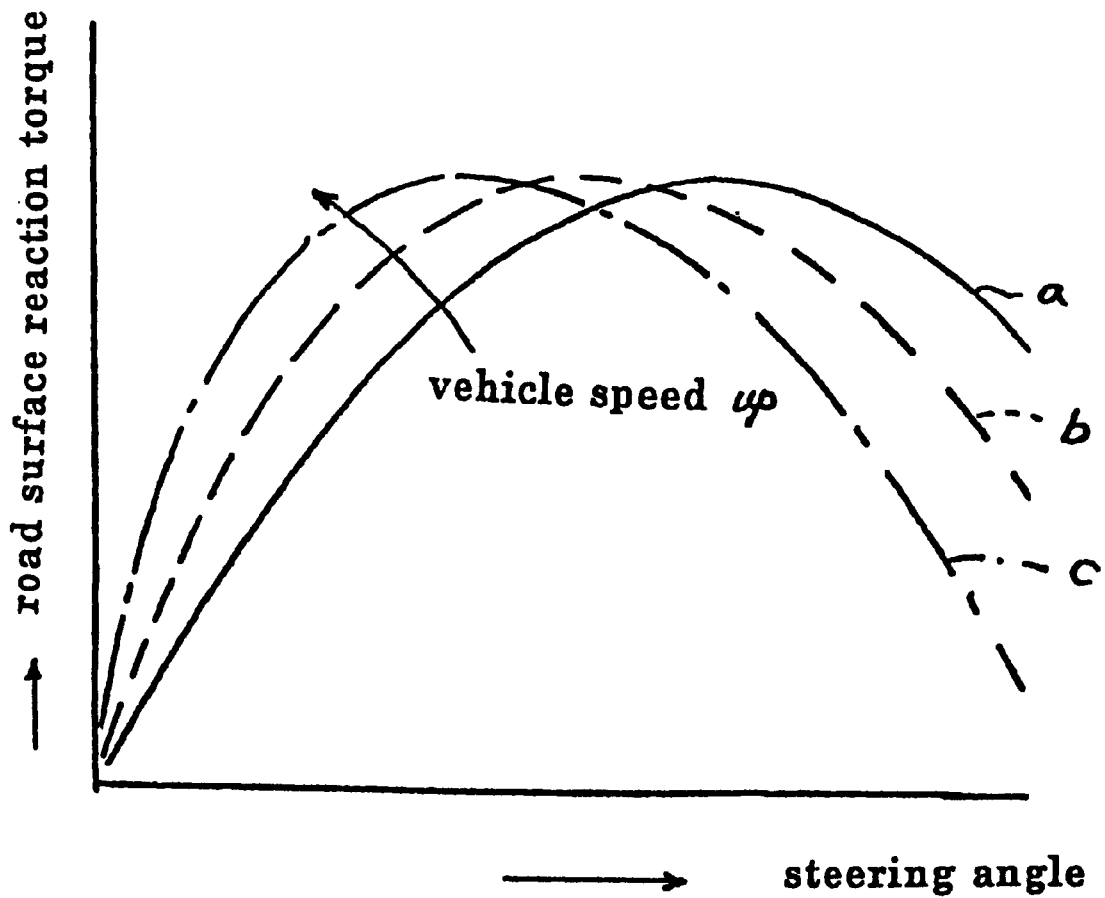
FIG. 3 is a diagram illustrating the characteristics of a second road reaction torque used by the electric power steering controller shown in FIG. 1.

FIG. 2 is a flowchart illustrating the operation of the electric power steering controller in accordance with Embodiment 1 of the present invention. FIG. 3 is a graph illustrating the characteristics of the second road reaction torque used by the electric power steering controller in accordance with Embodiment 1. In FIG. 3, there is a relation of the curve a<curve b<curve c for the vehicle speed.

The first road reaction torque estimator 15 for estimating the first road reaction torque is next described in detail. First, using the steering torque signal Tsens, the motor speed signal dω corresponding to the roll acceleration of the steering shaft, the motor current signal Imtr, and Eq. (1), the following steady-state reaction force signal T'rea_est is obtained:

$$T'rea\_est = Tsens + Kt \cdot Imtr - J \cdot d\omega \quad (1)$$

where Kt is the torque constant of the motor converted into a value on the steering and J is the moment of inertia of the steering mechanism.

Then, a primary filter calculation as given by Eq. (2) is performed using the steady-state reaction force signal and the low-pass filter mounted in the first reaction torque estimator 15. In this way, the first steady-state reaction force signal Trea_est as given by Eq. (2) is obtained.

$$dTrea\_est/dt = -Trea\_est/T1 + T'rea\_est/T1 \quad (2)$$

where T1 is the time constant of the primary filter that is so set that the cutoff frequency $f_c = 1/(2\pi \cdot T1)$ lies between 0.05 and 1.0 Hz.

The first road reaction torque can be detected using Eqs. (1) and (2) for the following reason. The equation of motion for the steering mechanism is given by $$J \cdot d\omega s/dt = Thdl + Tmtr - Tfric - Treact \quad (3)$$

where dωs/dt is the roll acceleration of the steering shaft, Thdl is the steering torque, Tmtr is the motor output torque (converted into a value on the steering), Tfric is the frictional torque within the steering mechanism, and Treact is the road reaction torque (converted into a value on the steering).

Solving Eq. (3) about the road reaction torque Rreact gives rise to $$Treact = Thdl + Tmtr - J \cdot d\omega s/dt - Tfric \quad (4)$$

Accordingly, the first road reaction torque Treact can be found by using the values of the steering torque, the motor output torque, the roll acceleration of the steering shaft, and the frictional torque within the steering mechanism. The steering torque signal Tsens can be used as the steering torque Thdl. The motor current signal Imtr multiplied by the torque constant Kt can be used as the motor output torque Tmtr. The motor acceleration signal dω can be used as the roll acceleration dωs/dt of the steering shaft. Therefore, the road reaction torque within the steering mechanism that is free of the effects of the frictional torque Tfric can be detected using Eq. (1).

On the other hand, the frictional torque Tfric acts as a relay with respect to the rotational speed of the steering mechanism. It is widely known in control engineering that the relay is equivalently represented in terms of a gain and a phase by an equivalent linearization method. Therefore, the first steady-state road reaction signal Trea_est can be obtained by adjusting the gain and phase of the steady-state reaction signal T'rea_est by the primary filter given by Eq. (2), the steady-state reaction signal T'rea_est being detected by Eq. (1).

That is, the most common method of adjusting the gain and phase is to use a filter. Those frequencies that can be adjusted by a filter with gain and phase are frequencies higher than the cutoff frequency. If the cutoff frequency is set to a range that is 0.5 to 1 times the frequency to be adjusted, the gain can be adjusted within a range of about 1 to 0.5 times. The phase can be adjusted within a range of about 0 to −20 deg. The effects of the frictional torque can be eliminated in most cases. The steering frequency generally used in automobiles is about 0.1 to 1 Hz. If the cutoff frequency is set to a range of 0.5 to 1 times the steering frequency, i.e., from about 0.05 Hz to 1 Hz, the effects of frictional torque can be eliminated. In practical applications, the cutoff frequency is so set as to achieve a steering frequency that should be controlled most efficiently based on the detected road reaction torque signal.

The second reaction torque estimator 16 estimates a second road reaction torque from the steering angle (θHdl) and from the vehicle speed (Vx), based on the relation between the steering angle and the reaction from the road surface, the relation being shown in the characteristic diagram of FIG. 3. This reaction torque estimator 16 is next described in detail.

The road reaction torque that is a self-aligning torque can be computed from the steering angle because of the following relation. Since cornering forces act on rear portions of the road contact surfaces of the tires, the tires are always undergoing self-aligning torque that directs the tires in the direction of movement of the vehicle during driving. At small tire skid angles of about 4 to 6 degrees, for example, a proportional relation exists between the lateral skid angle and the cornering force. Also, the self-aligning torque is roughly in proportion to the lateral skid angle. Similarly, at small tire skid angles, the lateral skid angle has a 1:1 relation to the steering angle provided the vehicle speed is kept constant. Consequently, the self-aligning torque can be found from the steering angle.

The relation between the lateral skid angle and the steering angle is determined for each value of the vehicle speed. Furthermore, for given road surface conditions, the cornering force and the self-aligning torque have a 1:1 relationship to the lateral skid angle, or the steering angle, for each value of the vehicle speed. Accordingly, the relation of the self-aligning torque, or the road reaction torque from a road surface having a high μ value, to the steering angle of the vehicle of interest has been previously found experimentally for each value of the vehicle speed. This relation can be calculated as the road reaction torque by the second reaction torque estimator 16 incorporated in the electric power steering system.

The relation shown in FIG. 3 is previously determined for a road surface having a high μ value. With respect to road surface conditions, the cornering power decreases with reducing the μ value. The self-aligning torque Trea given by the following equation decreases with reducing the μ value. The μ value means a road surface friction coefficient.

$$Trea = \xi \cdot Kf \cdot \beta f$$

where ξ is the sum of caster trail and pneumatic trail, Kf is the cornering power of the front wheels, and βf is the lateral skid angle of the front tires. Because of this relation, the previously estimated value of the second road reaction torque for a road surface having a high μ value fundamentally differs from the first estimated value of the road reaction torque.

The present invention copes with faults of the steering angle sensor if such faults are present. The steering torque detector 1 has a torque detection portion and a signal-processing portion both of which are of the double structure. This steering torque detector 1 is a key sensor in the electric power steering system, is used as a reference for detection of a failure, and detects defect of the steering angle sensor as a failure. The detector 1 prevents the target current in the motor from being adversely affected.

The operation of the electric power steering controller constructed as described above to detect a failure is described by referring to the flowchart of FIG. 2. First, the steering torque detector 1 reads the steering torque Thdl (step S101) and stores the torque in memory. The steering torque controller 2 computes an auxiliary torque signal Ibase used for control of the motor (step S102). Then, the motor speed detector 3 reads the motor speed signal (step S103). The motor acceleration detector 5 differentiates the motor speed signal, thus computing the motor acceleration signal (step S104).

The motor current detector 11 reads the motor current Imtr (step S105) and stores it in memory. Subsequently, the steering torque is added to a motor torque that is calculated from the output from the motor current detector 11 and converted into a value on the steering. In this way, a sum torque is derived. A motor inertia torque converted into a value on the steering is calculated from the output from the motor acceleration detector 5. The first reaction torque estimator 15 produces the difference between the sum torque and the motor inertia torque and passes the difference through a low-pass filter. A first estimated value of road surface reaction torque (Ttire_est1) is computed (step S106).

Then, the steering angle (θhdl) indicated by the output from the steering angle sensor is read and stored in memory (step S107). Thereafter, the vehicle speed (Vx) is read by the vehicle speed detector 14 and stored in memory (step S108). Then, the second reaction estimator 16 estimates a second road surface reaction torque (Ttire_est2) from the relation shown in FIG. 3 (stepS109). The returning torque compensator 17 finds a steering wheel return-assisting torque signal (Itire) from the second road reaction torque (Ttire_est2) by table lookup (step S110). Then, the difference between the output (Ttire_est2) from the second road reaction estimator and the output (Ttire_est1) from the first road reaction estimator is calculated, using a calculational formula ΔTire_est=Ttire_est2−Ttire_est1 (step S111).

Then, a decision is made as to whether the difference ΔTire_est between the second and first road reaction torques is greater than a given value ΔTfail (step S112). If the result of the decision is YES, the steering angle sensor is judged to be at fault. The steering wheel return-assisting torque signal Itire is set to 0 (step S113). If the result of the decision is NO, the steering angle sensor or the vehicle speed sensor is judged to be normal.

Finally, the motor current determiner 9 finds the target torque using the calculational formula Iref=Ibase+Itire (step S114). The target torque is multiplied by the gain, thus calculating the target current. At this time, the gain is taken to be the reciprocal of the torque constant of the motor 10 converted into a value on the steering.

These operations are executed by the main processing of a CPU included in the controlller. Consequently, unstable steering action that would be induced by a generation of abnormal steering wheel return-assisting torque signal and would give the driver the feeling that he is in danger due to a fault in the steering angle sensor can be circumvented or suppressed.

In Embodiment 1, an appropriate assisting torque can be generated by the motor under every driving condition by estimating the road reaction torque through the use of the first reaction torque estimator 15 and the second reaction torque estimator 16. As a consequence, the steering-wheel returnability can be improved. Also, unstable steering action that would be induced by a generation of abnormal steering wheel return-assisting torque signal and would give the driver the feeling that he is in danger due to a fault in the steering angle sensor can be circumvented or suppressed.

Embodiment 2

Figure 4:
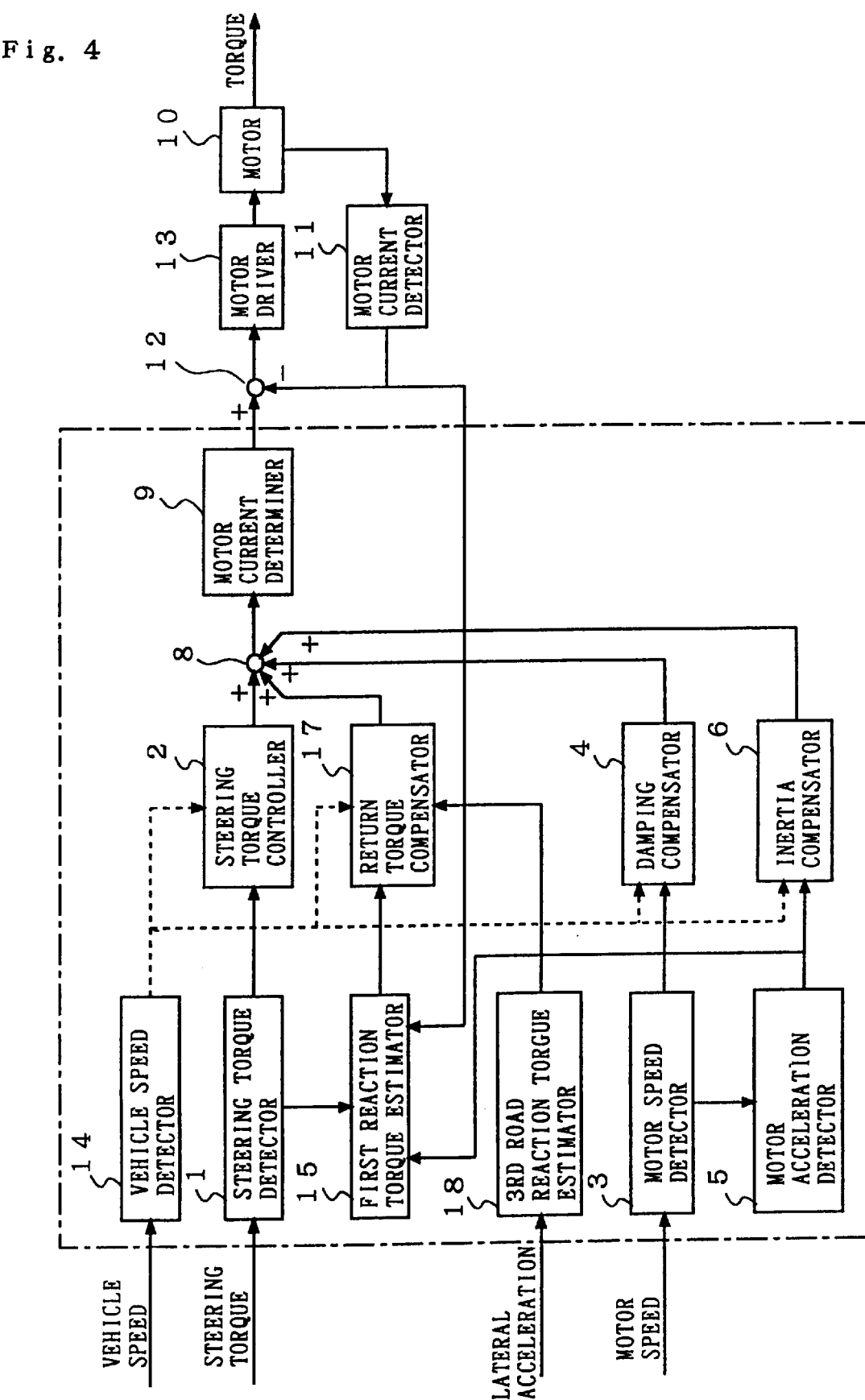
FIG. 4 is a block diagram of an electric power steering controller in accordance with Embodiment 2 of the invention.

FIG. 4 is a block diagram showing the structure of an electric power steering controller in accordance with Embodiment 2 of the present invention. This controller shown in FIG. 4 has components 1–6, 8–15, and 17 that are identical with their respective counterparts 1–6, 8–15, and 17 shown in FIG. 1. This electric power steering system shown in FIG. 4 further includes a third reaction torque estimator forming a third road reaction torque estimation means for estimating a third road reaction torque (a sixth road reaction torque) based on the lateral acceleration detected by a lateral acceleration sensor 18 that forms a lateral acceleration detection means.

Figure 5:
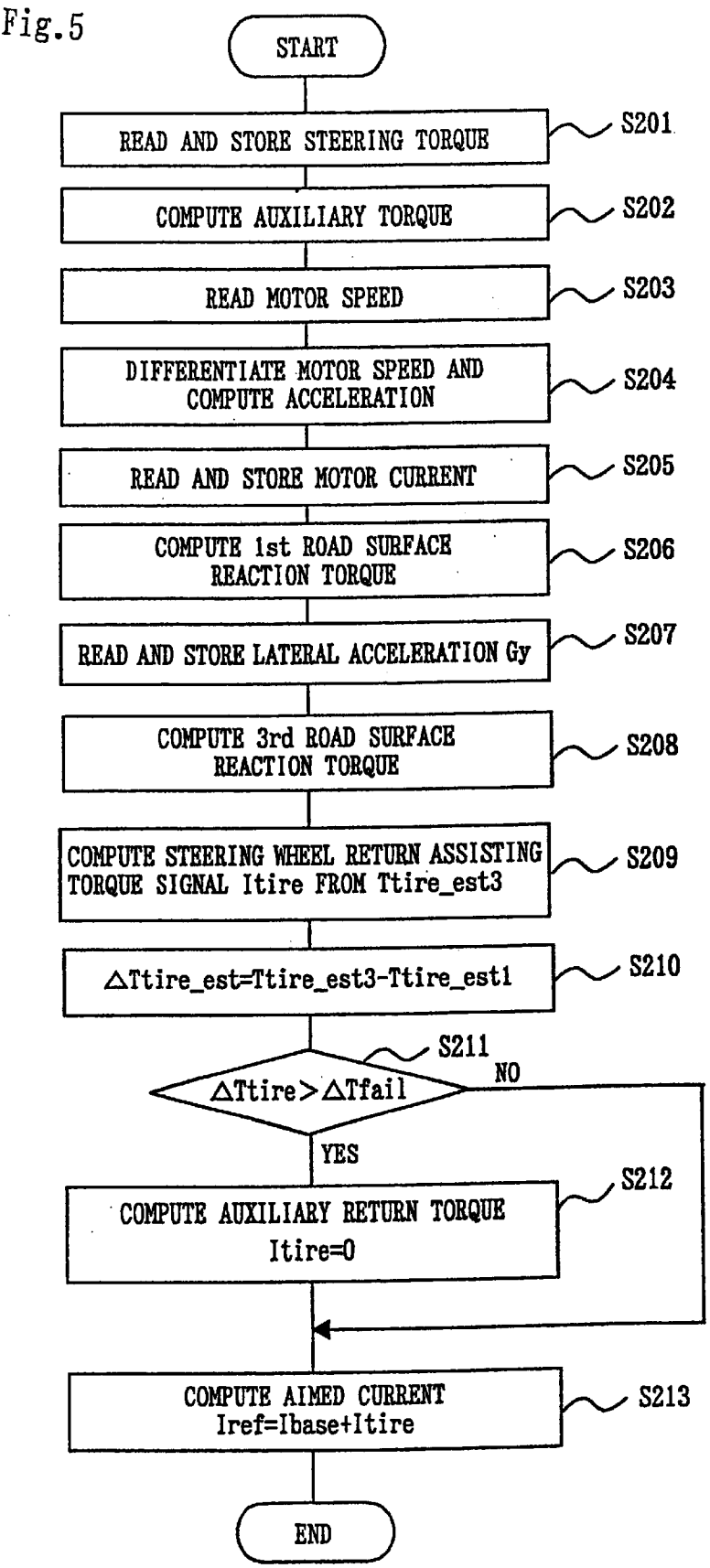
FIG. 5 is a flowchart illustrating the operation of the electric power steering controller shown in FIG. 4.
Figure 6:
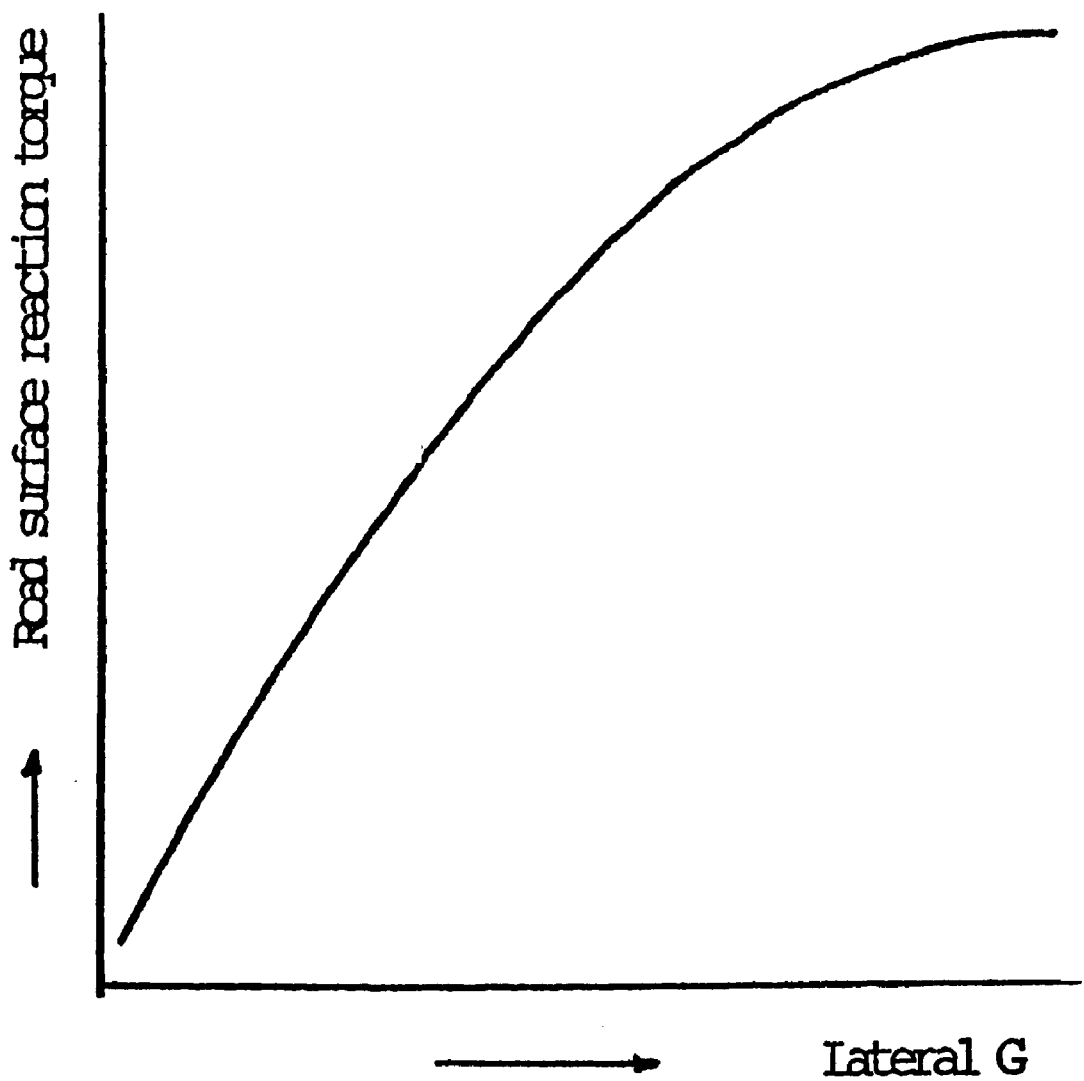
FIG. 6 is a characteristic diagram illustrating the relation between the value of road reaction torque estimated by the electric power steering controller shown FIG. 4 and the lateral acceleration of the vehicle.

FIG. 5 is a flowchart illustrating the operation of the electric power steering controller in accordance with Embodiment 2 of the present invention. FIG. 6 is a graph illustrating the relation between the value of road reaction torque estimated by the electric power steering controller in accordance with Embodiment 2 of the present invention and the lateral acceleration that the vehicle undergoes.

In FIG. 6, the horizontal axis indicates the lateral acceleration in G. Embodiment 2 is characterized in that the output from the lateral acceleration sensor for detecting the lateral acceleration that the vehicle is undergoing is applied to the third road reaction torque estimator instead of the second road reaction torque estimator for receiving the output from the steering angle sensor of the construction of Embodiment 1.

The operation of the electric power steering system in accordance with Embodiment 2 is next described by referring to FIG. 5. Steps 201–S206 similar to the steps S101–S106 illustrated in FIG. 2 are carried out to calculate the first estimated value of road reaction torque (Ttire_est1).

Then, the output from a lateral acceleration sensor for detecting the lateral acceleration that the vehicle undergoes is read as Gy (step S207). In an operating range where the lateral acceleration Gy is about 0.2 to 0.1 G, the lateral acceleration Gy and the road reaction shows a substantially linear, 1:1 relation as shown in FIG. 6. The third reaction torque estimator 18 estimates a third road surface reaction torque Ttire_est3 from the relation illustrated in FIG. 6 (step S208). Then, the returning torque compensator 17 finds the steering wheel return-assisting torque signal Itire from the third road reaction torque Ttire_est3 by table lookup (step S209). Thereafter, the difference between the output (Ttire_est3) from the third road reaction estimator 18 and the output (Ttire_est1) from the first road reaction estimator 15 is calculated, using a calculational formula ΔTire_est=Tire_est3−Ttire_est1 (step S210).

Then, a decision is made as to whether the difference ΔTire_est between the estimated values of the road reaction torque is greater than the given value ΔTfail (step S211). If the result of the decision is YES, the lateral acceleration sensor is judged to be at fault. The steering return-assisting torque signal Itire is set to 0 (step S212). If the result of the decision made in step S211 is NO, the lateral acceleration sensor or the vehicle speed sensor is judged to be normal.

Finally, the motor current determiner 9 finds the target torque using a calculational formula Iref=Ibase+Itire (step S213). This target torque is multiplied by the gain, thus calculating the target current. At this time, the gain is taken to be the reciprocal of the torque constant of the motor 10 converted into a value on the steering.

In Embodiment 2, these operations are carried out by main processing of the CPU in the power steering system and so unstable steering action that would be induced by a generation of abnormal steering wheel return-assisting current and would give the driver the feeling that he is in danger due to a fault in the lateral acceleration sensor can be circumvented or suppressed.

Embodiment 3

Figure 7:
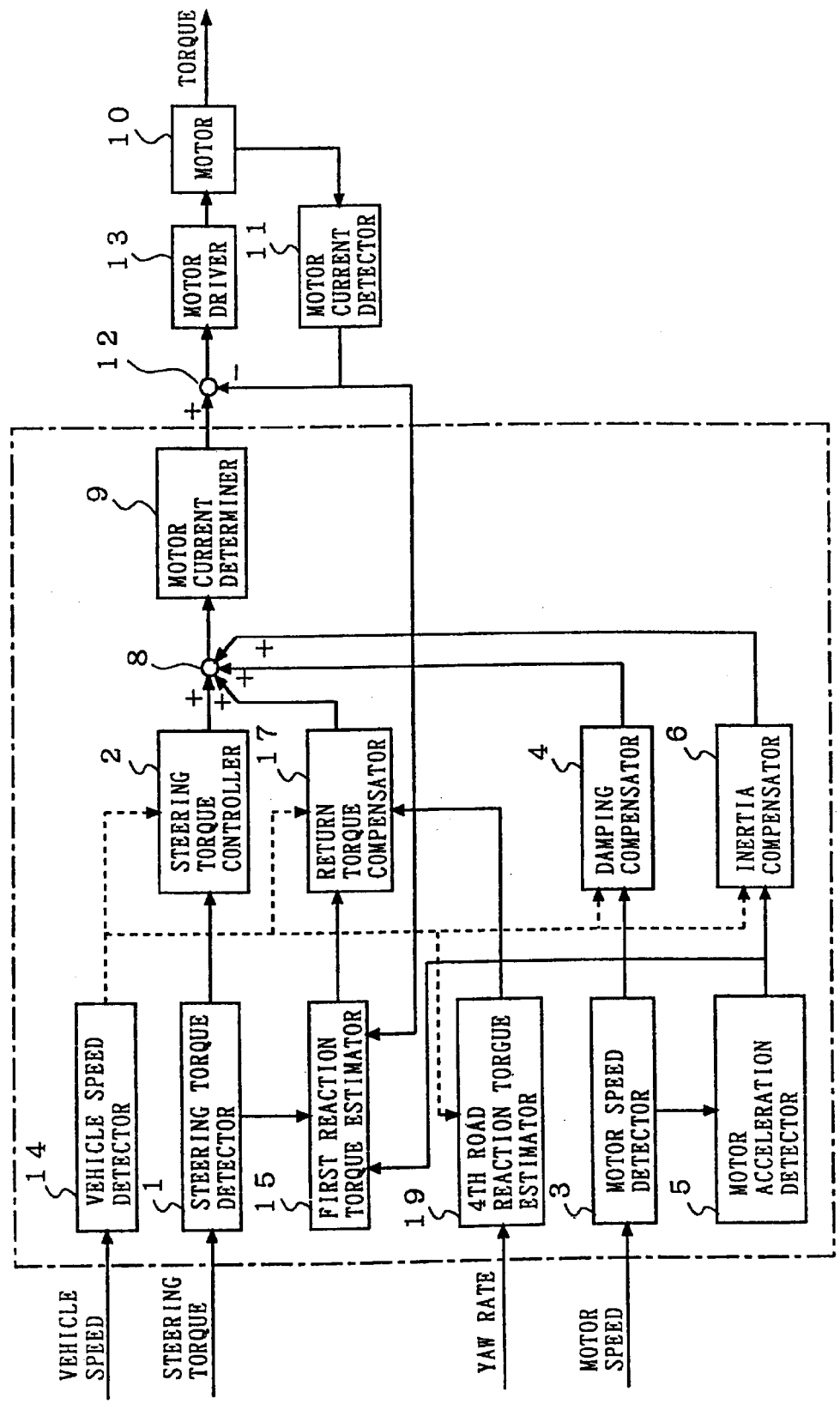
FIG. 7 is a block diagram of an electric power steering controller in accordance with Embodiment 3 of the invention.

FIG. 7 is a block diagram showing the structure of an electric power steering controller in accordance with Embodiment 3 of the present invention. This controller shown in FIG. 7 has components 1–6, 8–15, and 17 that are identical with their respective counterparts 1–6, 8–15, and 17 shown in FIG. 1. This electric power steering system shown in FIG. 7 further includes a fourth reaction torque estimator 19 forming a fourth road reaction torque estimation means that estimates a fourth value of road surface reaction torque (sixth road reaction torque) from the vehicle yaw rate detected by a yaw rate sensor forming a yaw rate detection means.

Figure 8:
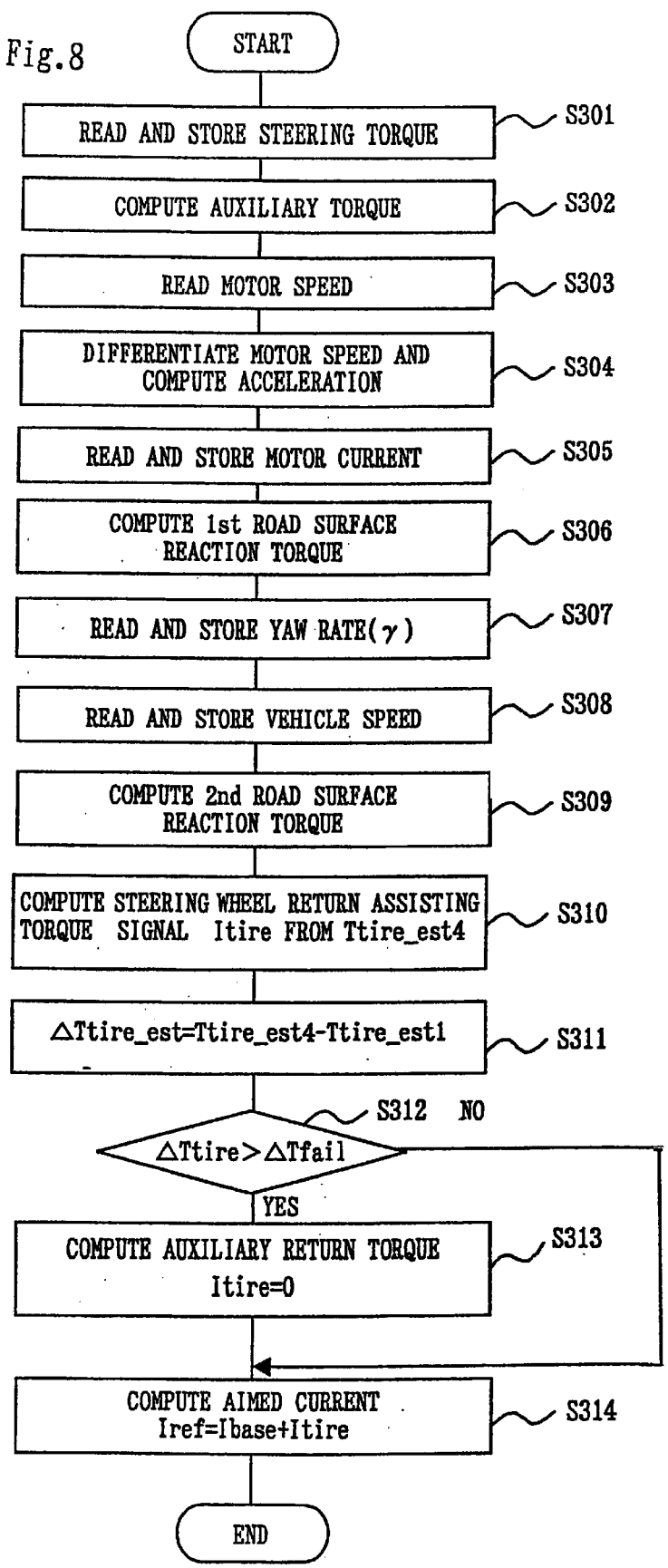
FIG. 8 is a flowchart illustrating the operation of the electric power steering controller shown in FIG. 7.

FIG. 8 is a flowchart illustrating the operation of the electric power steering controller in accordance with Embodiment 3 of the invention. In this Embodiment 3, the output from the yaw rate sensor for detecting the yaw rate of the vehicle and the output from the vehicle speed detector 14 are applied to the fourth reaction torque estimator 19 instead of the second reaction torque estimator 16 for receiving the output from the steering angle sensor of the construction of Embodiment 1.

The operation of the electric power steering controller in accordance with Embodiment 3 is next described by referring to FIG. 8. Steps 301–S306 similar to the steps S101–S106 illustrated in FIG. 2 are carried out to calculate the first estimated value of road reaction torque (Ttire_est1).

Then, the output (γ) from the yaw rate sensor for detecting the yaw rate of the vehicle is read and stored in memory (step S307). Then, the output from the vehicle speed detector 14 is read as Vx (step S308). The fourth value of road reaction torque is estimated (step S309). Under operating conditions in which the steering-wheel returnability must be improved in response to the steering wheel return-assisting torque signal based on the reaction from the road surface, the lateral skid angle β is generally small and its effects can be neglected by assuming that the lateral slid angle speed d β is zero (dβ=0). Since the relation Gy/Vx=γ+dβ holds among the lateral skid angular velocity dβ, the lateral acceleration Gy, the yaw rate γ, and the vehicle speed Vx, d β=0 leads to Gy/Vx=γ, i.e., Gy=γ·Vx. From this, the lateral acceleration Gy is calculated. The fourth road reaction torque Tire_est4 is estimated from the relation already mentioned in the description of Embodiment 2 in connection with FIG. 6. The returning torque compensator 17 finds the steering wheel return-assisting torque signal Itire based on the fourth road reaction torque Tire_est4 by table lookup (step S310).

Then, the difference between the output (Ttire_est4) from the fourth road reaction estimator and the output (Ttire_est1) from the first road reaction estimator is calculated, using the calculational formula ΔTire_est=Tire_est4−Ttire_est1 (step S311). A decision is made as to whether the difference ΔTire_est between the estimated values of the road reaction torque is greater than the given value ΔTfail (step S312). If the result of the decision is YES, the yaw rate sensor is judged to be at fault. The steering return-assisting torque signal Itire is set to 0 (step S313). If the result of the decision made in step S312 is NO, the yaw rate sensor or the vehicle speed sensor is judged to be normal.

Finally, the motor current determination unit 9 finds the target torque using the calculational formula Iref=Ibase+Itire (step S314). This target torque is multiplied by the gain, thus calculating the target current. At this time, the gain is taken to be the reciprocal of the torque constant of the motor 10 converted into a value on the steering.

In Embodiment 3, these operations are carried out by main processing of the CPU in the power steering controller and so unstable steering action that would be induced by a generation of abnormal steering wheel return-assisting current and would give the driver the feeling that he is in danger due to a fault in the yaw rate sensor can be circumvented or suppressed.

In Embodiments 1–3, the returning torque compensator may also perform calculational processing to judge that failure has occurred when any one of the output from the first road reaction torque estimator and the output from the second road reaction torque estimator is kept outside a tolerable range for a given time.

The output of the first reaction torque estimator 15 uses a low-pass filter and so if the driver steers very quickly, the output from the first reaction torque estimator 15 may become smaller than all of the outputs from the second through fourth road reaction torque estimators 16,18,19 even under normal conditions. Where the driver steers very quickly under normal conditions, the steering angle is repeatedly increased and decreased and so the state that the output from the first reaction torque estimator 15 is smaller than all of the outputs from the second through fourth road reaction torque estimators ends always in a short time. Accordingly, if this state persists for more than a given time, and if this state is judged to be at fault, then the controller is prevented from judging a normal state as a faulty state.

The returning torque compensator may also perform calculational processing to judge that failure has occurred when the steering speed detected by the steering speed detection means is less than a given value and, at the same time, any one of the outputs from the second through fourth road reaction torque estimators is kept outside a tolerable range for a given time.

Where the driver steers very quickly, the steering speed is high and therefore, if the controller is so designed that when the steering speed is lower than a given value and thus the low-pass filter produces no effects, the controller judges that there is failure if and only if the output from the first reaction torque estimator is less than any one of the outputs from the second through fourth road reaction torque estimators, then the controller is prevented from judging a normal state as a faulty state.

When the driver steers very quickly, the first road reaction torque Ttire_est1 is always smaller than the second through fourth road reaction torques Ttire_est2, Ttire_est3, and Ttire_est4. Conversely, therefore, if the first road reaction torque Ttire_est1 becomes higher, and if the controller judges that there is failure, then the controller is prevented from judging a normal state as a faulty state.

Embodiment 4

Figure 9:
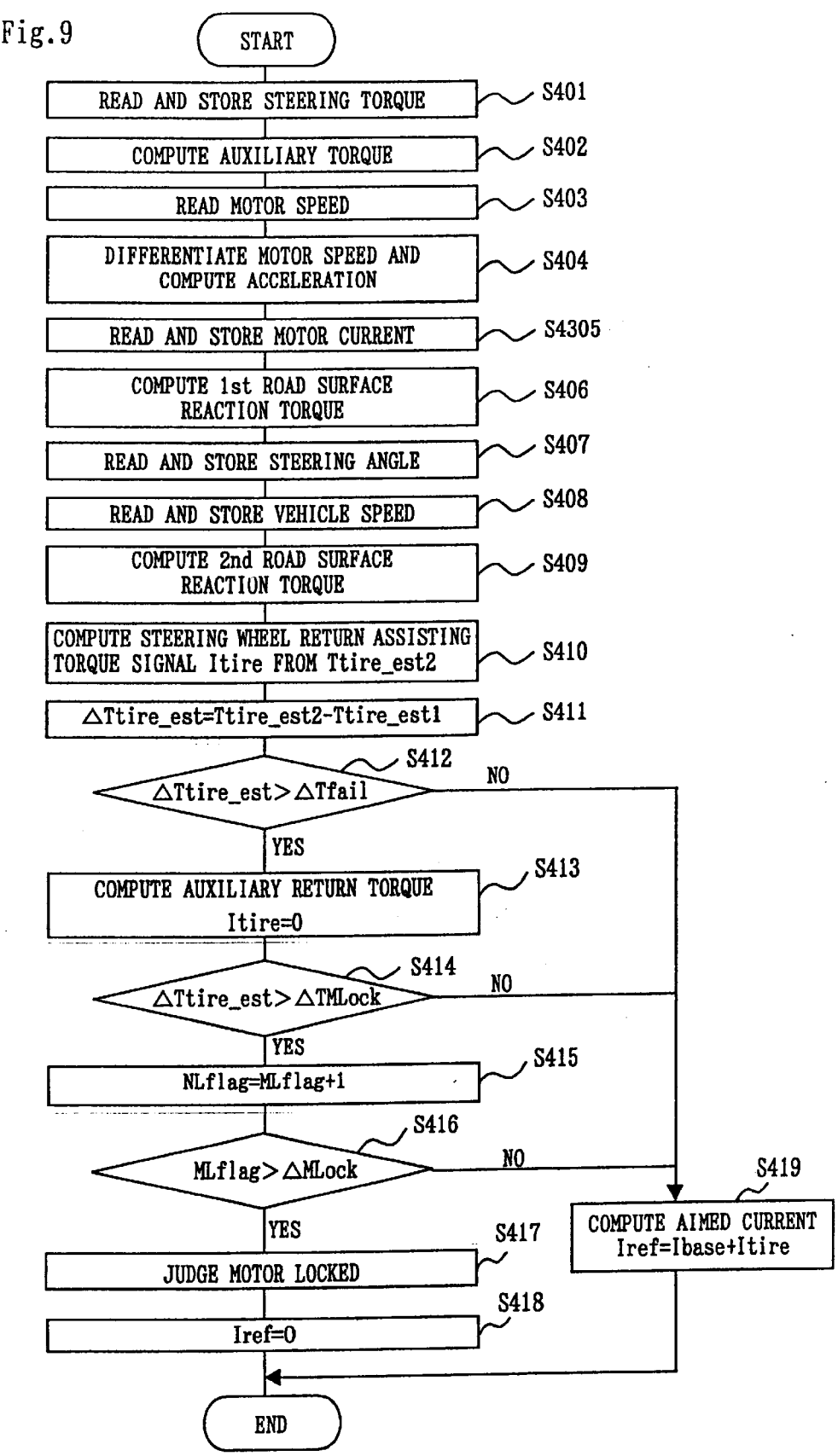
FIG. 9 is a flowchart illustrating the operation of an electric power steering controller in accordance with Embodiment 4 of the invention.

Embodiment 4 of the present invention is now described by referring to FIG. 1. FIG. 9 is a flowchart illustrating the operation of an electric power steering controller in accordance with Embodiment 4. Embodiment 4 is similar in structure with Embodiment 1 except that the returning torque compensator judges that the motor has locked when the output from the first road reaction torque estimator is kept greater than the output from the second road reaction torque estimator by more than a given amount for a given period.

If the motor has mechanically locked, the driver will forcibly manipulate the locked motor with force of his arm and, therefore, the steering torque detector 1 keeps producing an excessive output of more than about 10 N·m for 50 to 200 msec or longer. In this case, this excessive steering torque is applied to the first road reaction torque estimator 15. As a result, the output from the first road reaction torque is kept greater than the output from the second road reaction torque estimator 16 by more than a given value for a given time. In this case, it is judged that the motor has locked.

The operation of the electric power steering controller in accordance with Embodiment 4 is next described by referring to FIG. 9. Steps S401–S413 similar to the steps S101–S113 of FIG. 2 are carried out. If the result of the decision made in step S412 is NO, control goes to step S419, in which the motor current determiner 9 finds the target torque using the calculational formula Iref=Ibase+Itire. The target torque is multiplied by the gain, thus calculating the target current. At this time, the gain is taken to be the reciprocal of the torque constant of the motor 10 converted into a value on the steering.

If the result of the decision made in step S412 is YES, the step S413 is executed, and then a decision is made as to whether ΔTtire_est is greater than the given value ΔTMLock generated when the motor has locked (step S414). If the result of the decision is YES, a flag counter indicating locked state of the motor is incremented (MLflag=MLflag+1) (step S415). A decision is made as to whether the count obtained by the flag counter MLflag indicating the locked state of the motor is in excess of a given value Mlock (step S416). If the result of the decision is YES, it is judged that the motor has locked (step S417). The target current Iref is set to 0 (Iref=0) (step S418). Thus, the present control routine is ended. In the present Embodiment 4, the state that the motor has locked can be precisely judged.

Embodiment 5

Figure 10:
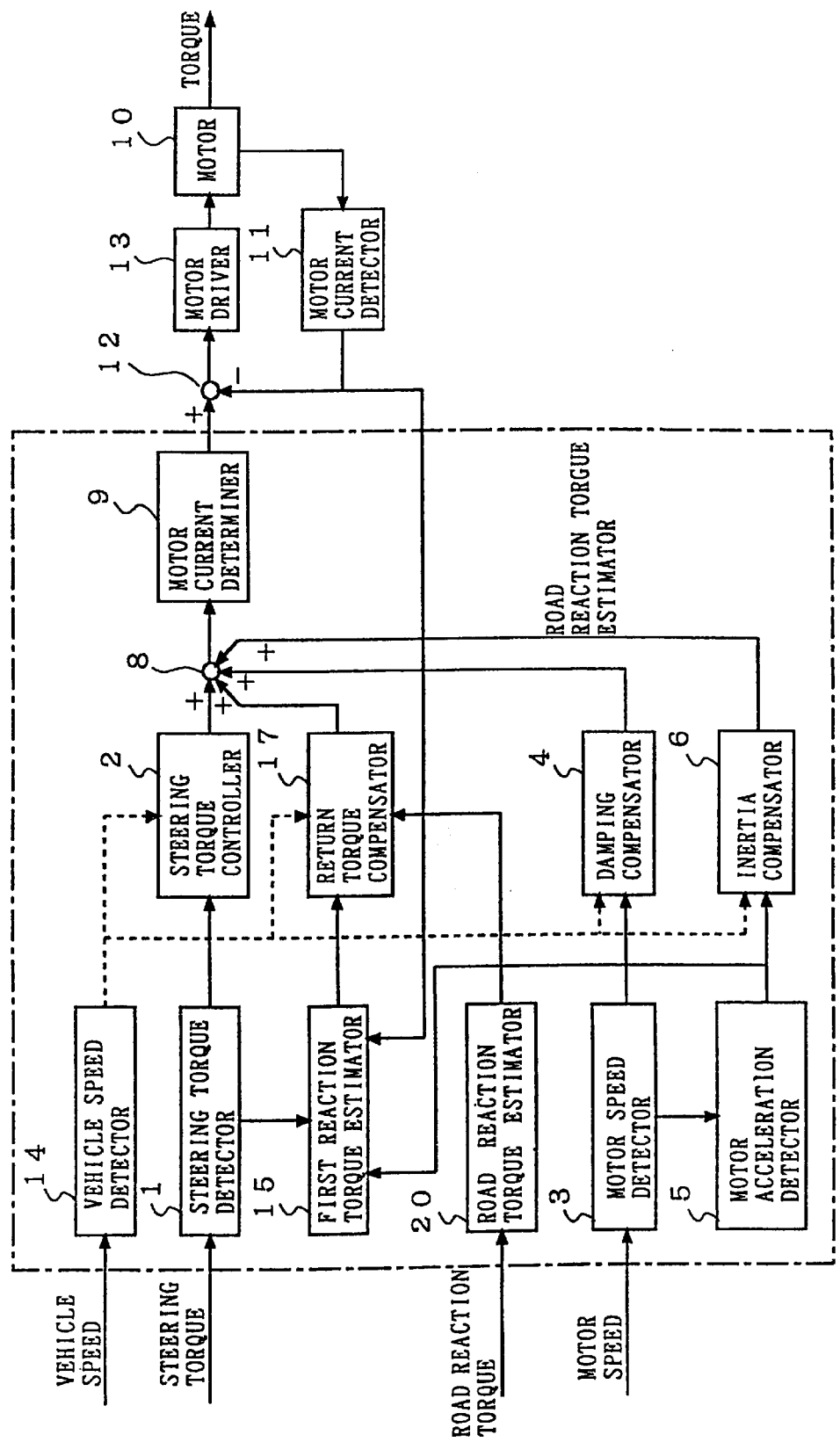
FIG. 10 is a block diagram of an electric power steering controller in accordance with Embodiment 5 of the invention.

FIG. 10 is a block diagram showing the structure of an electric power steering controller in accordance with Embodiment 5 of the invention.

Figure 11:
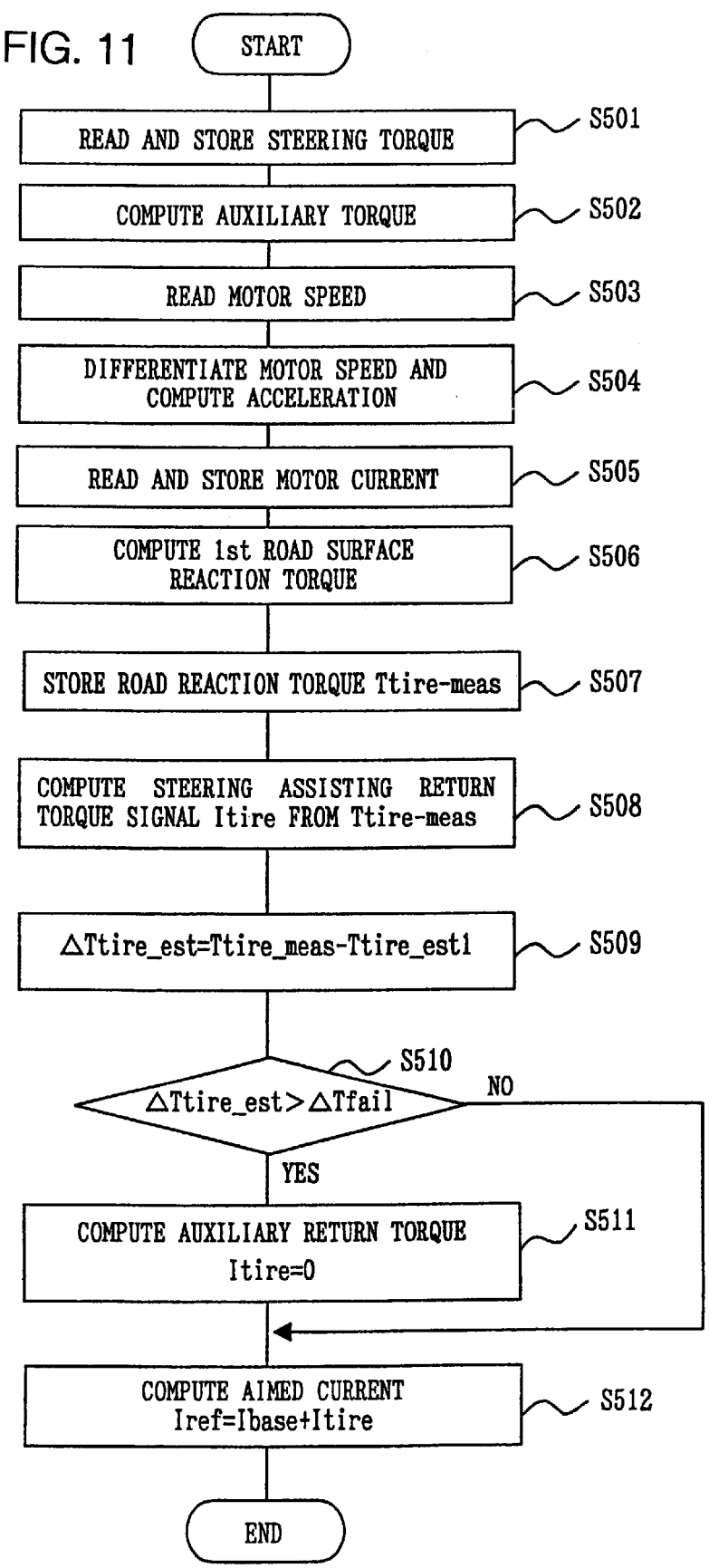
FIG. 11 is a flowchart illustrating the operation of the electric power steering controller shown in FIG. 10.

This controller shown in FIG. 10 has components 1–6, 8–15, and 17 that are identical with their respective counterparts 1–6, 8–15, and 17 shown in FIG. 1. This electric power steering system shown in FIG. 10 further includes a road reaction torque detector 20 for detecting a reaction torque from the road surface. FIG. 11 is a flowchart illustrating the operation of the electric power steering controller in accordance with Embodiment 5 of the invention.

In Embodiment 5, the road reaction torque detector 20 mounted on the steering shaft is provided instead of the second road reaction torque estimator for receiving the output from the steering angle sensor of the construction of Embodiment 1. In Embodiment 5, the output from the road reaction torque detector 20 mounted on the steering shaft (fifth road reaction torque) and the first road reaction torque estimated by the first road reaction torque estimator 15 are compared. Based on the result of this comparison, a fault in the road reaction torque detector 20 is detected. The operation of the electric power steering controller in accordance with Embodiment 5 is next described by referring to FIG. 11. Steps S501–S506 similar to the steps S101–S106 illustrated in FIG. 2 are carried out to calculate the first estimated value of road reaction torque Ttire_est1.

Then, the output from the road reaction torque detector 20 is read and stored as road reaction torque Ttire_meas in memory (step S507). The returning torque compensator 17 finds steering wheel return-assisting torque signal Itire based on the road reaction torque Ttire_meas by table lookup (step S508).

Subsequently, the difference between the output Ttire_meas from the road reaction torque estimator 20 and the output Ttire_est1 from the first road reaction torque detector is calculated using a calculational formula ΔTtire_est= Ttire_means−Ttire_est1 (step S509). Then, a decision is made as to whether the difference ΔTtire_est between the road reaction torques is greater than the given value ΔTfail (step S510). If the result of the decision is YES, it is judged that the road reaction torque detector 20 is at fault. The steering wheel return-assisting torque signal Itire is set to 0 (step S511). If the result of the decision is NO, it is judged that the road reaction torque detector 20 is normal (step S510).

Finally, the motor current determiner 9 finds the target torque using the calculational formula Iref=Ibase+Itire, and multiplies the target torque by the gain, thus calculating the target current (step S512). At this time, the gain is taken to be the reciprocal of the torque constant of the motor 10 converted into a value on the steering.

It is also possible to make a decision as to whether the difference ΔTire_est between the road reaction torques is kept greater than the given value ΔTfail for more than a given time (step S510).

In Embodiment 5, unstable steering action that would be induced by a generation of abnormal steering wheel return-assisting torque signal and would give the driver the feeling that he is in danger due to a fault in the road reaction torque detector 20 can be circumvented or suppressed.

Embodiment 6

Figure 12:
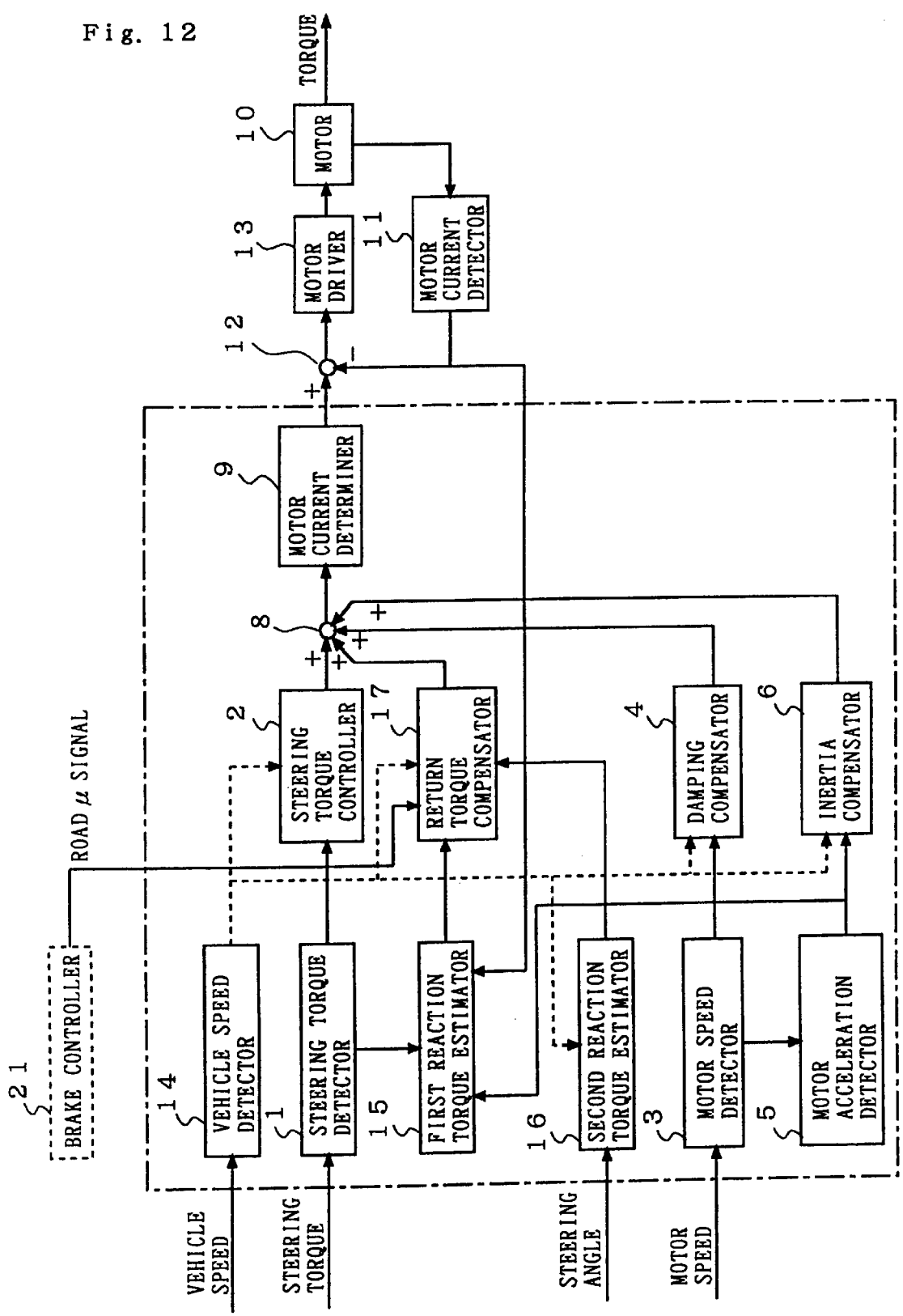
FIG. 12 is a block diagram of an electric power steering controller in accordance with Embodiment 6 of the invention.

FIG. 12 is a block diagram showing the structure of an electric power steering controller in accordance with Embodiment 6 of the present invention. This steering controller shown in FIG. 12 has components 1–6 and 8–17 identical with their respective counterparts 1–6 and 8–17 shown in FIG. 1. The steering controller shown in FIG. 12 further includes a brake controller 21 connected with the electric power steering controller via an in-vehicle LAN.

Figure 13:
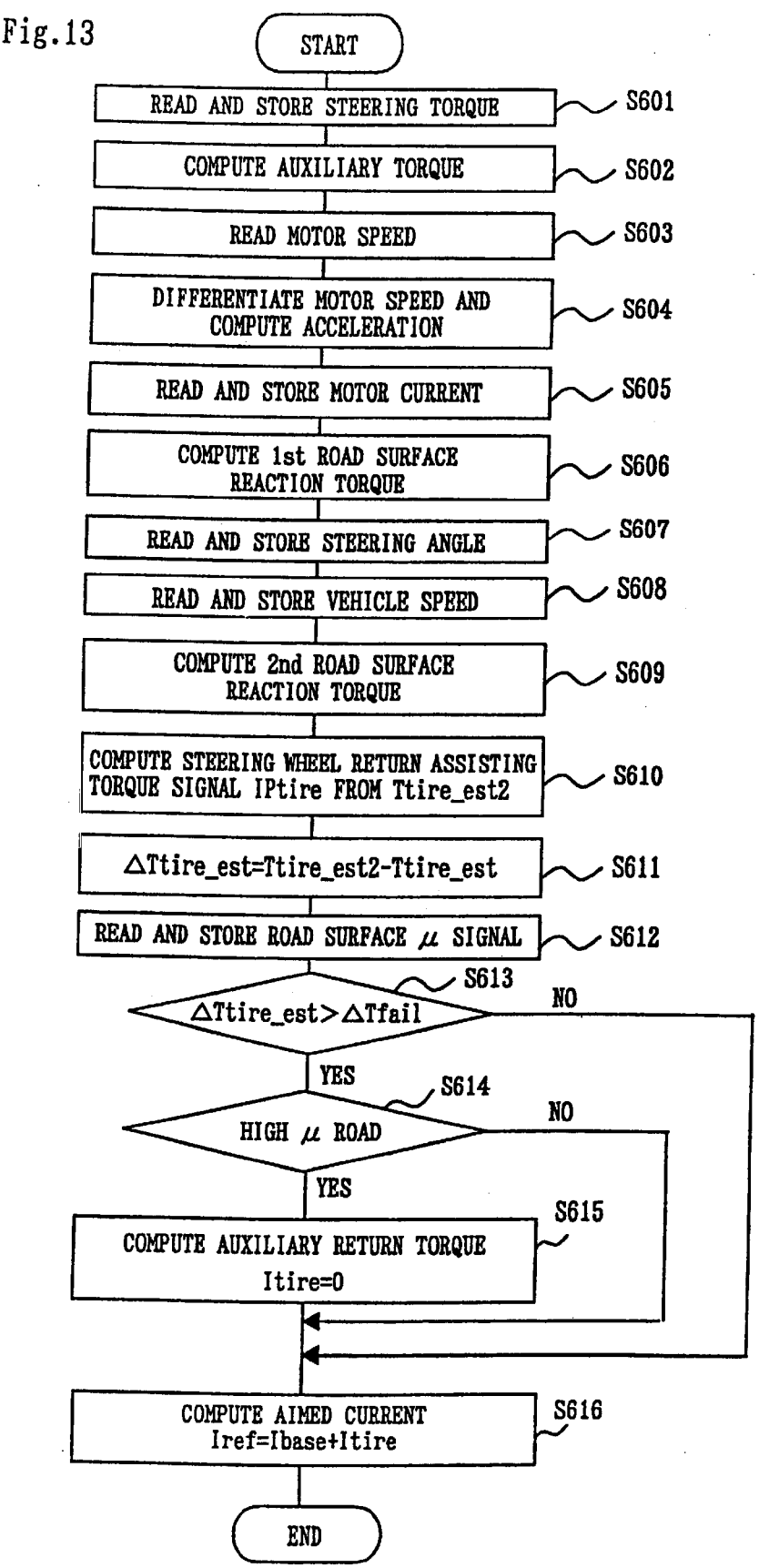
FIG. 13 is a flowchart illustrating the operation of the electric power steering controller shown in FIG. 12.
Figure 14:
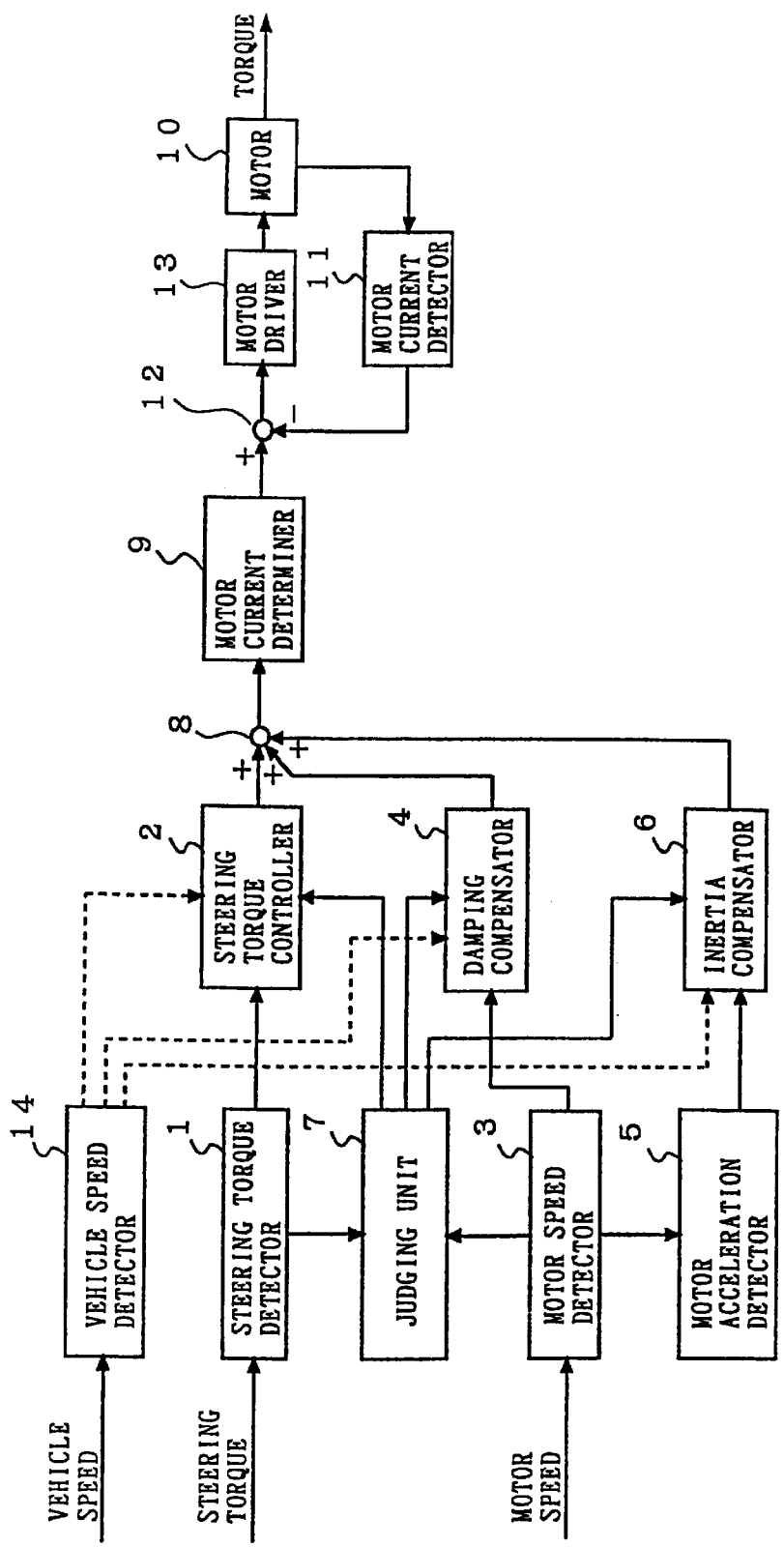
FIG. 14 is a block diagram of the prior art electric power steering controller.

FIG. 13 is a flowchart illustrating the operation of an electric power steering controller in accordance with Embodiment 6 of the invention. Embodiment 6 is similar to Embodiment 1 except that a road frictional coefficient signal indicating the frictional coefficient $\mu$ of the road surface is applied to the returning torque compensator 17 from the brake controller 21 via the in-vehicle LAN to judge that the road surface has a very high value of $\mu$, and that, if such a judgment is made, a decision as to whether failure has occurred is not made.

The brake controller employs the prior art technique such as utilization of making a decision based on a signal indicating the speed of the vehicle wheels.

The operation of the electric power steering controller in accordance with Embodiment 6 is next described by referring to FIG. 13. Steps S601–S611 similar to the steps S101–S111 of FIG. 2 are carried out, and the difference between the output Ttire_est2 from the second road surface reaction torque estimator and the output Ttire_est1 from the first road surface reaction torque estimator is calculated using a calculational formula ΔTtire_est=Ttire_est2− Ttire_est1.

Then, the road surface frictional signal is read from the brake controller 21 via the in-vehicle LAN and stored in memory (step S612). A decision is made as to whether the difference ΔTtire_est between the estimated values of the road surface reaction torque is greater than the given value ΔTfail (step S613). If the result of the decision is YES, a decision is made as to whether the frictional value $\mu$ is high or not (step S614). If the frictional coefficient is high, the steering wheel return-assisting torque signal Itire is set to 0 (step S615). If the result of the decision made in step S613 is NO, the steering angle sensor is judged to be normal. If the result of the decision made in step S615 is NO, a decision as to whether failure has occurred is not made.

Finally, the motor current determiner 9 finds the target torque using the calculational formula Iref=Ibase+Itire (step S616). The target torque is multiplied by the gain, thus calculating the target current. At this time, the gain is taken to be the reciprocal of the torque constant of the motor 10 converted into a value on the steering.

In Embodiment 6, unstable steering action that would be induced by a generation of abnormal steering wheel return-assisting current and would give the driver the feeling that he is in danger due to a fault in the steering angle sensor can be circumvented or suppressed according to the road conditions.

What is claimed is:

1. An electric power steering controller mounted on a vehicle and using torque generated by an electric motor to supplement a driver's steering torque, said electric power steering controller comprising:

an electric motor;

steering torque detection means for detecting steering torque applied by a driver to a steering wheel;

steering angle detection means for detecting a steering angle;

first road reaction torque estimation means for estimating a first road reaction torque that tires of the vehicle receive from a road surface using the steering torque detected by said steering torque detection means;

second road reaction torque estimation means for estimating a second road reaction torque using the steering angle detected by said steering angle detection means; and returning torque compensation means for controlling an assisting torque produced by said electric motor in a direction to return the steering wheel to an original position according to the second road reaction torque estimated by said second road reaction torque estimation means, said returning torque compensation means determining that said steering angle detection means has a fault when a difference between the first road reaction torque and the second road reaction torque is greater than a given value.

2. The electric power steering controller claimed in claim 1, wherein said returning torque compensation means determines that there is a fault when a difference between two estimated road reaction torques remains greater than a given value for a given time.

3. The electric power steering controller claimed in claim 1, further including a steering speed detection means for detecting steering speed, and wherein said returning torque compensation means determines that there is a fault when the steering speed detected by said steering speed detection means is less than a given value and, at the same time, a difference between two estimated road reaction torques is greater than a given value.

4. The electric power steering controller claimed in claim 1, wherein said returning torque compensation means determines that there is a fault when the first road reaction torque is greater than other estimated road reaction torque by more than a given value.

5. The electric power steering claimed in claim 1, wherein said returning torque compensation means determines that said motor has locked when the first road reaction torque remains greater than other estimated road reaction torque by more than a given value for a given time.

6. The electric power steering controller claimed in claim 1, wherein said returning torque compensation means determines road conditions and wherein, if said returning torque compensation means determines that a road surface condition is low friction, no decision as to whether said detection means has a fault is made.

7. An electric power steering controller mounted on a vehicle and using torque generated by an electric motor to supplement a driver's steering torque, said electric power steering controller comprising:

an electric motor;

steering torque detection means for detecting steering torque applied by a driver to a steering wheel;

lateral acceleration detection means for detecting lateral acceleration of the vehicle;

first road reaction torque estimation means for estimating a first road reaction torque that tires of the vehicle receive from a road surface using the steering torque detected by said steering torque detection means;

second road reaction torque estimation means for estimating a second road reaction torque from the lateral acceleration of the vehicle detected by said lateral acceleration detection means; and returning torque compensation means for controlling an assisting torque produced by said electric motor in a direction to return the steering wheel to an original position according to the second road reaction torque estimated by said second road reaction torque estimation means, said returning torque compensation means determining that said lateral acceleration detection means has a fault when a difference between the first road reaction toque and the second road reaction torque is greater than a given value.

8. An electric power steering controller mounted on a vehicle and using torque generated by an electric motor to supplement a driver's steering torque, said electric power steering controller comprising:

an electric motor;

steering torque detection means for detecting steering torque applied by a driver to a steering wheel;

yaw rate detection means for detecting yaw rate of the vehicle;

first road reaction torque estimation means for estimating a first road reaction torque that tires of the vehicle receive from a road surface using the steering torque detected by said steering torque detection means;

second road reaction torque estimation means for estimating a second road reaction torque from the yaw rate of the vehicle detected by said yaw rate detection means; and returning torque compensation means for controlling an assisting torque produced by said electric motor in a direction to return the steering wheel to an original position according to the second road reaction torque estimated by said second road reaction torque estimation means, said returning torque compensation means determining that said yaw rate detection means has a fault when a difference between the first road reaction torque and the second road reaction torque is greater than a given value.

9. An electric power steering controller mounted on a vehicle and using torque generated by an electric motor to supplement a driver's steering torque, said electric power steering controller comprising:

an electric motor;

steering torque detection means for detecting steering torque applied by a driver to a steering wheel;

first road reaction torque estimation means for estimating a first road reaction torque that tires of the vehicle receive from a road surface using the steering torque detected by said steering torque detection means;

second road reaction torque detection means for detecting a second road reaction torque; and returning torque compensation means for controlling an assisting torque produced by said electric motor in a direction to return the steering wheel to an original position according to the second road reaction torque estimated by said second road reaction torque estimation means, said returning torque compensation means determining that any one of said first and second road reaction torque detection means has a fault when a difference between the first road reaction torque and the second road reaction torque is greater than a given value.

10. The electric power steering controller claimed in claim 9, wherein said returning torque compensation means determines that there is a fault when the first road reaction torque remains greater than the second road reaction force by more than a given value for a given time.

11. A method of controlling an electric power steering controller by using torque generated by an electric motor to supplement a driver's steering torque, said method comprising:

estimating a first road reaction torque using the steering torque;

estimating a second road reaction torque using any one of a steering angle, lateral acceleration of the automobile, and yaw rate of the automobile detected by detection means;

controlling the assisting torque produced by said motor in a direction to return a steering wheel to a center position according to the estimated second road reaction torque; and determining, based on a difference between the first road reaction torque and the second road reaction torque whether said detection means have a fault.

12. The method of controlling an electric power steering controller claimed in claim 11, including determining that there is a fault when a difference between the first and second road reaction torques remains greater than a given value for a given time.

13. The method of controlling an electric power steering controller claimed in claim 11, including determining road conditions, and wherein, if the road surface condition is a low friction, not making any decision as to whether the detection means have a fault.

* * * * *